United States Patent [19]

Kirk

[11] 4,211,002
[45] Jul. 8, 1980

[54] HAND-HELD PEELER

[76] Inventor: Norbert A. Kirk, 43 E. Ohio St., Room 930, Chicago, Ill. 60611

[21] Appl. No.: 15,723

[22] Filed: Feb. 27, 1979

[51] Int. Cl.² .................................................. A47J 17/14
[52] U.S. Cl. ..................................... 30/123.3; 99/593; 30/276
[58] Field of Search ................... 30/123, 123.3, 124; 99/593; 30/276

[56] References Cited

U.S. PATENT DOCUMENTS

| 1,591,860 | 7/1926 | McGinnis | 30/276 |
| 3,026,612 | 3/1962 | Szczepanski | 30/123 R |
| 3,852,882 | 12/1974 | Bettcher | 30/276 |
| 4,008,720 | 2/1977 | Brinckmann | 30/123.3 |
| 4,073,056 | 2/1978 | Schaeffer | 30/276 |
| 4,128,939 | 12/1978 | Schaeffer | 30/123 |

Primary Examiner—Jimmy C. Peters
Attorney, Agent, or Firm—Larson, Taylor and Hinds

[57] ABSTRACT

A hand-held peeler for vegetables and the like having an elongate housing containing a fluid driven motor and a bladed drum. In one embodiment, the motor is connected to a source of pressurized water with a hose. A detachable hollow drum having axially aligned, elongate blades mounted at the circumference of the drum is coaxially attached to the water motor and rotates in the elongate housing. The bladed drum is exposed and accessible through an opening in the housing. Water exiting the water motor is used to wash peels and such from the bladed drum and elongate housing.

10 Claims, 3 Drawing Figures

HAND-HELD PEELER

FIELD OF THE INVENTION

This invention relates generally to the peeling of vegetables and the like by a powered tool, and more particularly, in the preferred embodiment, to a peeling tool powered by a pressurized fluid such as water.

BACKGROUND OF THE INVENTION

Powered tools for peeling vegetables have been disclosed in the prior art. For instance, in U.S. Pat. No. 1,591,860 to McGinnis, an electric powered vegetable peeler is shown having spiral blades which rotate in a casing. This prior art device has an opening in the casing to facilitate engagement of the blades with the vegetable and a second opening for discharge of the peelings. Another vegetable peeler using a water or electric motor is disclosed in U.S. Pat. No. 3,026,612 to Szczepanski. The device disclosed in this patent has a motor remote from the peeling tool, and coupled to a vaned peeling rotor via a flexible shaft. The vaned rotor for this device is made of a flexible material so that the flexing action helps keep the vanes clear of peelings. In addition, where a water motor is used, water from the motor may also be used to help flush peelings from the vanes of the rotor.

However, none of the foregoing prior art devices provides for an efficient and safe peeling tool. In particular, any electric tool would be dangerous because the peeling tool might be used near or in running water. While the device disclosed in the patent to Szczepanshi can be water driven, it would not be very efficient to use low pressure tap water due to friction loses in the flexible driving shaft. In addition, the water flushing action used to clean the vanes could result in water droplets being flung off the vanes, and out the vegetable insertion opening. While part of the vaned rotor is covered, it would be necessary to be constantly aware of the position of the cover. It would also be inconvenient to have to maintain this cover always in one position to prevent water from being flung in all different directions as the device is being used.

Another disadvantage of the prior art is that when the blades become dull, the entire device becomes useless because the blades cannot be easily and inexpensively replaced. In addition, the blades provided with each device may cut too deeply in some softer vegetables while not cutting deep enough in other harder vegetables. It would also be difficult to effectively clean both the inside and outside of these prior art peelers.

SUMMARY OF THE INVENTION

The present invention provides a novel hand-held apparatus for peeling vegetables and the like which overcomes the above mentioned and other disadvantages of the prior art. The present invention in one embodiment provides a tap water pressure driven apparatus having a rotating bladed drum for peeling vegetables. The invention also provides an apparatus which channels low pressure working fluid over the cutting blades and the vegetable being peeled so that the blades are kept clean and the peelings are washed clear of the moving parts and out of the apparatus.

It is an object of the present invention to provide for an efficient and useful peeler. In a preferred embodiment, the bladed drum is directly attached to the water motor for efficient operation. Besides being used to power the water motor and wash the blades, the majority of the water expelled from the water motor flows out of the peeler through a spout and can be used to wash the vegetables when they are not being peeled.

It is a further object of this invention to provide for a more versatile and long-lasting peeler. In one embodiment, the bladed drum is detachable. Therefore, when the blades of an old drum become dull, only the old drum need be replaced by a new drum rather than the replacement of the entire peeler. In addition, because the present apparatus comprises an easily replaceable bladed drum, an assortment of different bladed drums can be provided such that one drum can be used for one type of vegetable, while another may be inserted for a different type of vegetable.

One feature of a presently preferred embodiment of the present invention is to have an easily disassemblable apparatus so as to permit a thorough cleaning thereof.

It is also a feature of an embodiment of the present invention to provide an apparatus that is powered by water from a household tap in which the water also washes over the blades to remove peelings but is not flung from the device. Instead, the device is constructed without any spinning vanes which propel the water out vigorously and consequently the water flows out gently.

Other features, objects and advantages of the present invention are stated in or apparent from the detailed description of a presently preferred embodiment of the invention found hereinbelow.

DETAILED DESCRIPTION OF THE PREFERRED EMBODIMENT

Figure 1:
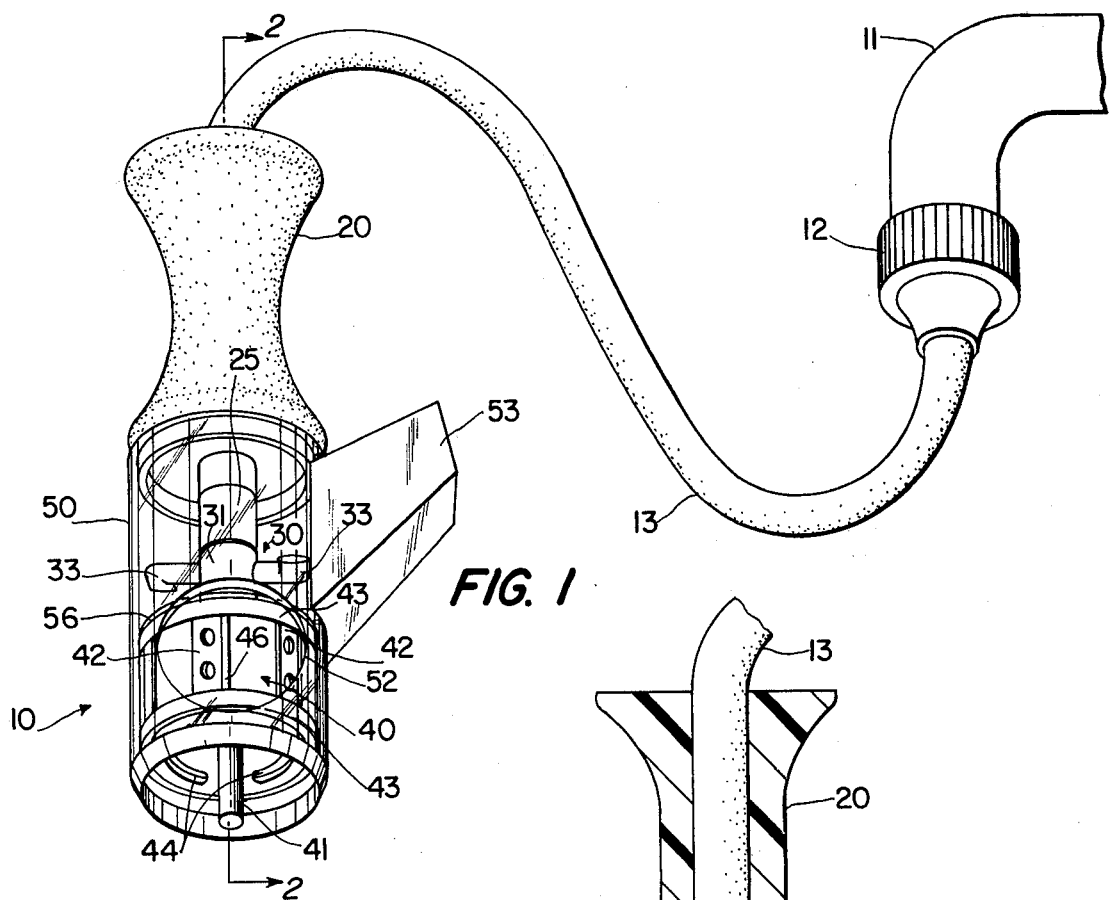
FIG. 1 is a perspective view of one embodiment of the present invention comprising a hose and hand-held peeler.

With reference now to the drawings in which like numerals represent like elements throughout the several views, a hand-held peeler 10, according to a presently preferred embodiment of the present invention is shown in FIG. 1 attached to a source of pressurized water, such as a conventional household tap or faucet 11 with a flexible hose 13. Flexible hose 13 is connected to faucet 11 by a suitable attaching means such as a conventional threaded coupling 12. In addition to threaded coupling 12, other conventional couplings such as a simple resilient, push-on coupling made of rubber or the like can also be used.

Figure 2:
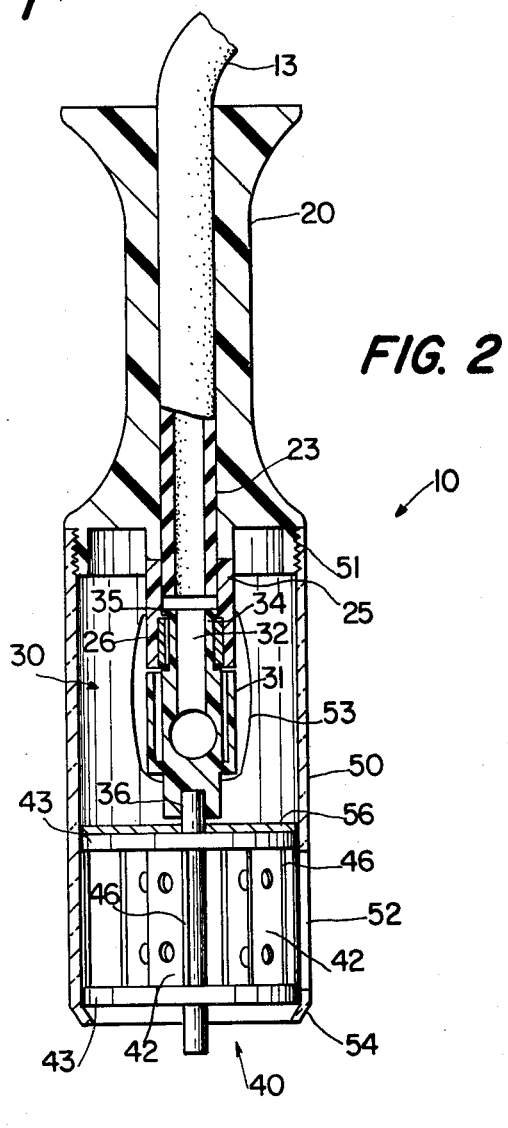
FIG. 2 is a cross-sectional view of the hand-held peeler taken along line 2—2 in FIG. 1.

Peeler 10 is comprised of an elongate housing which includes a handle portion 20 and a cylindrical body portion 50. As shown in FIG. 2, handle portion 20 is shaped to be easily held in one hand and has a handle bore 23 therethrough. Hose 13 extends through handle portion 20 in handle bore 23 and is rigidly attached to handle portion 20 such as being cemented therein. In one embodiment, handle portion 20 is made from a conventional unbreakable plastic, but it can also easily be made of other suitable materials, such as metal.

A water motor 30 is positioned inside of body portion 50 by a cylindrical bearing housing 25. Bearing housing 25 is rigidly attached to handle portion 20 and part of flexible hose 13 by a suitable glue. In this embodiment, bearing housing 25 should be made from a strong plastic. Located inside of bearing housing 25 is a bearing ring 26, made of brass, for instance. The outside diameter of bearing ring 26 should be slightly larger than the inside diameter of bearing housing 25 so that bearing ring 26 can be press fitted inside of bearing housing 25. To assure that bearing ring 26 is securely held, it is advantageous to provide small ribs on the outer diameter of bearing ring 26. The inside diameter of bearing ring 26 is smaller than the inside diameter of bearing housing 25. Water motor 30 has a rotor 31 with rotor bore 32 to provide fluid communication between hose 13 and jet nozzles 33 which are attached to rotor 31. Jet nozzles 33 direct the water expelled from them in a tangential direction opposite the direction of rotation of rotor 31, causing rotor 21 to spin. Rotor 31 has a reduced neck portion 34 slightly smaller than the inside diameter of ring bearing 26. Rotor 21 also has an enlarged radial lip 35 on the end nearest handle portion 10 so that rotor 31 rides on bearing ring 26 and is rotatably mounted on bearing ring 26.

Bladed drum 40 is detachably mounted on rotor 31 by an axle 41. Axle 41 is resiliently held inside of a keyway 36 located in the center of the rotor at the opposite end from radial lip 35. Bladed drum 40 is composed of a series of blades 42 rigidly mounted between two discs 43. Discs 43 are rigidly spaced around axle 41, and have arcuate disc apertures 44 spaced around axle 41.

Figure 3:
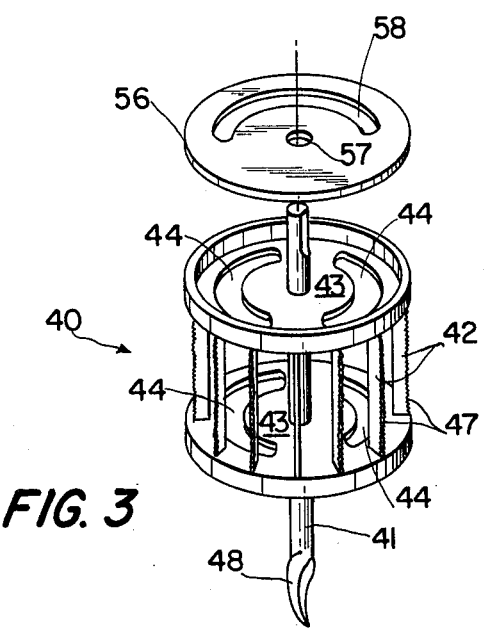
FIG. 3 is a perspective view of an alternative embodiment of a bladed drum used in the hand-held peeler.

In one embodiment, blades 42 have a sharpened cutting edge 46. In an alternative embodiment, as shown in FIG. 3, blades 42 have an upstanding edge 47. The different embodiments may be used for peeling different vegetables. For instance, the cutting edge 46 might be used for peeling cucumbers, which have a soft skin, while the serrated edge 47 might be used for carrots, which have a hard skin. Also shown in FIG. 3 is an optional potato eyer 48 located on the end of axle 41 for removing potato eyes or the like.

Cylindrical body portion 50, which surrounds both water motor 30 and bladed drum 40, is detachably mounted at one end on handle portion 10 by means of screw threads 51 and is open-ended at the other end. An orifice 52 of oval shape is provided in body portion 50 over bladed drum 40 so that vegetables placed in orifice 52 will engage blades 42 of bladed drum 40 and be peeled. Also provided on body portion 50 is an extending spout 53 through which most of the water which drives water motor 30 is discharged. An inwardly inclined lip 54 is located on the open end of body portion 50 to help protect against the accidental insertion of objects, including a finger of a user, inside of body portion 50.

An axle guide 56 is rigidly attached to body portion 50 so that it is located at a postion just below rotor 31. Axle guide 56 has an axle opening 57 which is slightly larger than axle 41 as well as an arcuate guide aperture 58. Axle guide 56 serves a dual purpose. During operation of the peeler 10, the rotation of both bladed drum 40 and rotor 31 are steadied due to the restraining of the rotation of axle 41 in axle opening 57. In addition, axle opening 57 serves as a guide for easier insertion of axle 41 into keyway 36 when bladed drum 40 is changed.

In operation, hose 13 is first attached to faucet 11 by a suitable threaded coupling 12. The user then folds peeler 10 in one hand by handle portion 20 in a suitable sink or drain area. Spout 53 should be pointing downward. At this point, the pressurized water is turned on.

The water flows out of faucet 11, through hose 13 and handle 20, to rotor bore 32. Due to the pressure of the water, the water is then forced out of rotor bore 32 through jet nozzles 33. The force of the water expelled from jet nozzle 33 is directed tangentially, causing rotor 31 to spin rapidly. Bladed drum 40, which is attached directly to rotor 31, also spins rapidly. Therefore, the vegetable is peeled by placing it in orifice 52 where it is peeled by action of the spinning blades 42.

Water motor 30 is steadied at two points to provide for a low friction and smooth operation. The first steadying point is bearing ring 26 in which neck portion 34 of rotor 31 is constrained to rotate with as little friction as possible. The other steadying point of water motor 30 is provided by axle opening 57 in axle guide 56. Axle 41 of bladed drum 40 is resiliently held in keyway 36 of rotor 31 and passes through axle opening 57. Therefore, axle 41 is constrained to rotate inside of axle opening 57, steadying both water motor 30 and bladed drum 40.

Most of the water which is expelled from jet nozzles 33 flows out of spout 53. This flow of water can be used to wash the vegetable before or after peeling. For convenience, the spout should be inclined slightly toward handle portion 20 so that body portion 50 can be raised slightly for easier use. Water which is not expelled from spout 53 flows through guide aperture 58. From there, the water may flow either between bladed drum 40 and body portion 50, or into bladed drum 40 through disc apertures 44. This water causes a washing of blades 42, and carries any debris out of body portion 50 through orifice 52 and over the vegetable, or over inclined lip 54 on the open end of body portion 50. The debris laden water flows out of body portion 50 gently because there is virtually no pronounced flinging action.

In order to change bladed drum 40, the extending portion of axle 41 is grasped and the other end of axle 41 is pulled from keyway 36 in rotor 31. The installation of bladed drum 40 in peeler 10 is made easier by axle guide 56. Guide opening 57 in axle guide 56 positions axle 41 for easy insertion into keyway 36. Thus, bladed drum 40 may be simply replaced if it becomes dull, or if a different type of bladed drum is needed for a different type of vegetable.

The installation of bladed drum 40 is also made easier if body portion 50 is made from a clear plastic. Thus, the user could more easily see where keyway 36 is located and how axle 41 is placed in it. The appearance of the device is also enhanced by a see-through body portion 50, as the user can see all parts in operation.

If for some reason peeler 10 becomes clogged or dirty, it is a simple matter to clean the entire device. After bladed drum 40 is easily removed, body portion 50 is unscrewed from handle portion 20. This leaves all parts exposed and easily washed.

Other alternative embodiments of the invention should be apparent to those of ordinary skill in the art. For instance, if water is found to flow out of spout 53 too rapidly, a baffle or the like could be installed. Also, additional jet nozzles 33 could be employed for a faster or more powerful motor.

Although the invention has been described in detail with respect to exemplary embodiments thereof, it will be understood by those of ordinary skill in the art that variations and modifications may be effected within the scope and spirit of the invention.

I claim:

1. A hand-held peeler for peeling vegetables and the like comprising:
   an elongate housing, including a handle portion having a bore therethrough, and a body portion coaxially aligned with and detachably mounted to said handle, and in communication with said bore, said body portion having an orifice therein;
   a flexible hose attached to said handle portion and in fluid communication with said bore;
   means to attach said hose to a source of pressurized water;
   a water motor, mounted in said body portion and driven by pressurized water conducted through said hose and said bore to rotate about the longitudinal axis of said housing; and
   a bladed drum removably attached coaxially to said water motor for rotation about the longitudinal axis of said housing and exposed and accessible through said body portion orifice such that a vegetable which is inserted in said body portion orifice can be peeled by said bladed drum.

2. A hand-held peeler as claimed in claim 1 wherein:
   said bladed drum includes two circular discs, said discs each having at least one aperture, spaced apart on an axle with bladed attached circumferentially on said discs; and
   said water motor provides a flow of water over and through said bladed drum through the apertures of said discs such that peels and the like are washed from said body portion.

3. A hand-held peeler as claimed in claim 2, further comprising:
   a spout, rigidly attached to said body portion, for dispensing water from said body portion which has been used to drive said water motor.

4. A hand-held peeler as claimed in claim 3 wherein:
   said water motor includes a hollow rotor in fluid communication with said bore having a plurality of jet nozzles for directing pressurized water exiting therefrom in a tangential direction opposite to the direction of rotation of said hollow rotor, such that the force created by the expulsion of pressurized water from said jet nozzles causes said hollow rotor of said water motor to rotate.

5. A hand-held peeler as claimed in claim 4, further comprising:
   an axle guide, rigidly attached to said body portion between said water motor and said bladed drum, having an aperture therein, said axle guide being positioned such that said axle of said bladed drum passes through said axle guide and is steadied by said axle guide during operation of the device, and said axle guide also providing a guide for attaching said axle in said water motor.

6. A hand-held peeler as claimed in claim 5 wherein said rotor contains a keyway for removably coaxially attaching said axle of said bladed drum to said rotor.

7. A hand-held peeler as claimed in claim 6 wherein said body portion is attached to said handle portion by screw threads;
   said means to attach said hose to a source of pressurized water includes a threaded coupling; and
   said rotor has a reduced neck portion which rotates inside of a coaxially aligned bearing ring attached to said handle portion, and said rotor also has a lip on said neck portion to engage the edge of said bearing ring nearest said handle portion such that said rotor rotates on said bearing ring.

8. A hand-held peeler as claimed in claim 7 wherein:
   said apertures in said circular discs and said axle guide are arcuately shaped.

9. A hand-held peeler as claimed in claim 8, further comprising:
   an inwardly inclined lip on the open end of said body portion.

10. A self-flushing, hand-held peeler for peeling vegetables and the like comprising:
    an elongate housing including
    a handle portion having a bore therethrough, and
    an open-ended body portion coaxially and removably attached to said handle portion, in communication with said bore, and further including an orifice and spout mounted thereon;
    a flexible hose attached to said handle portion and in fluid communication with said bore;
    means to attach said hose to a source of pressurized water;
    a water motor, mounted in said body portion and driven by pressurized water conducted through said hose and said bore to rotate about the longitudinal axis of said housing;
    a bladed drum, having means for water to enter and exit therethrough, removably attached coaxially to said water motor for rotation about the longitudinal axis of said housing and exposed and accessible through said body portion orifice,
    such that a vegetable which is inserted into said body portion orifice can be peeled by said bladed drum and said water motor provides a flow of water over and through said bladed drum washing peels and the like from said body portion and said bladed drum.

* * * * *